2 Sheets--Sheet 1.
F. L. POPE.
Improvement in Electric Signaling Apparatus for Railroads.
No. 5,622. Reissued Oct. 21, 1873.
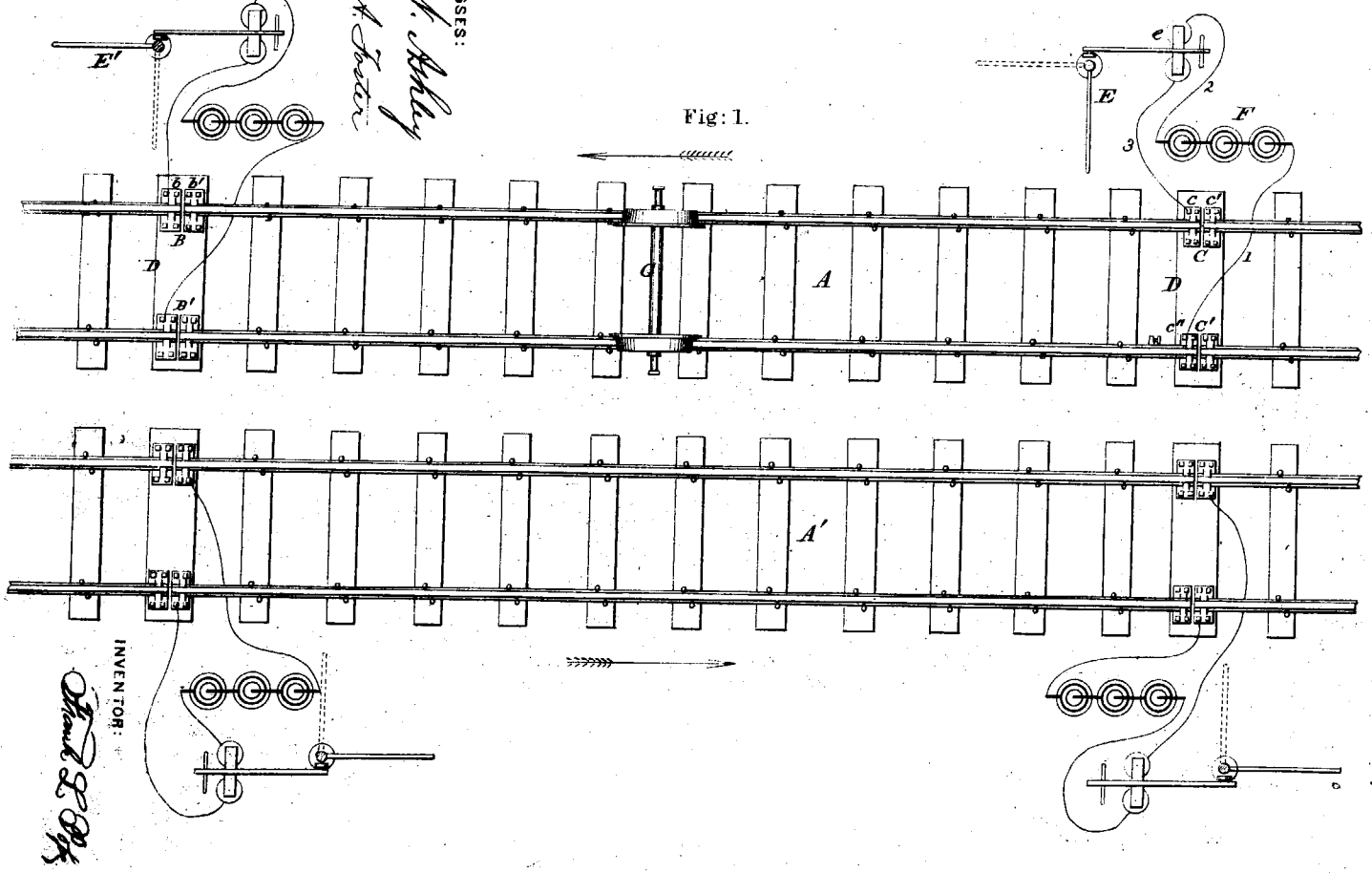

2 Sheets--Sheet 2.
F. L. POPE.
Improvement in Electric Signaling Apparatus for Railroads.
No. 5,622. Reissued Oct. 21, 1873.
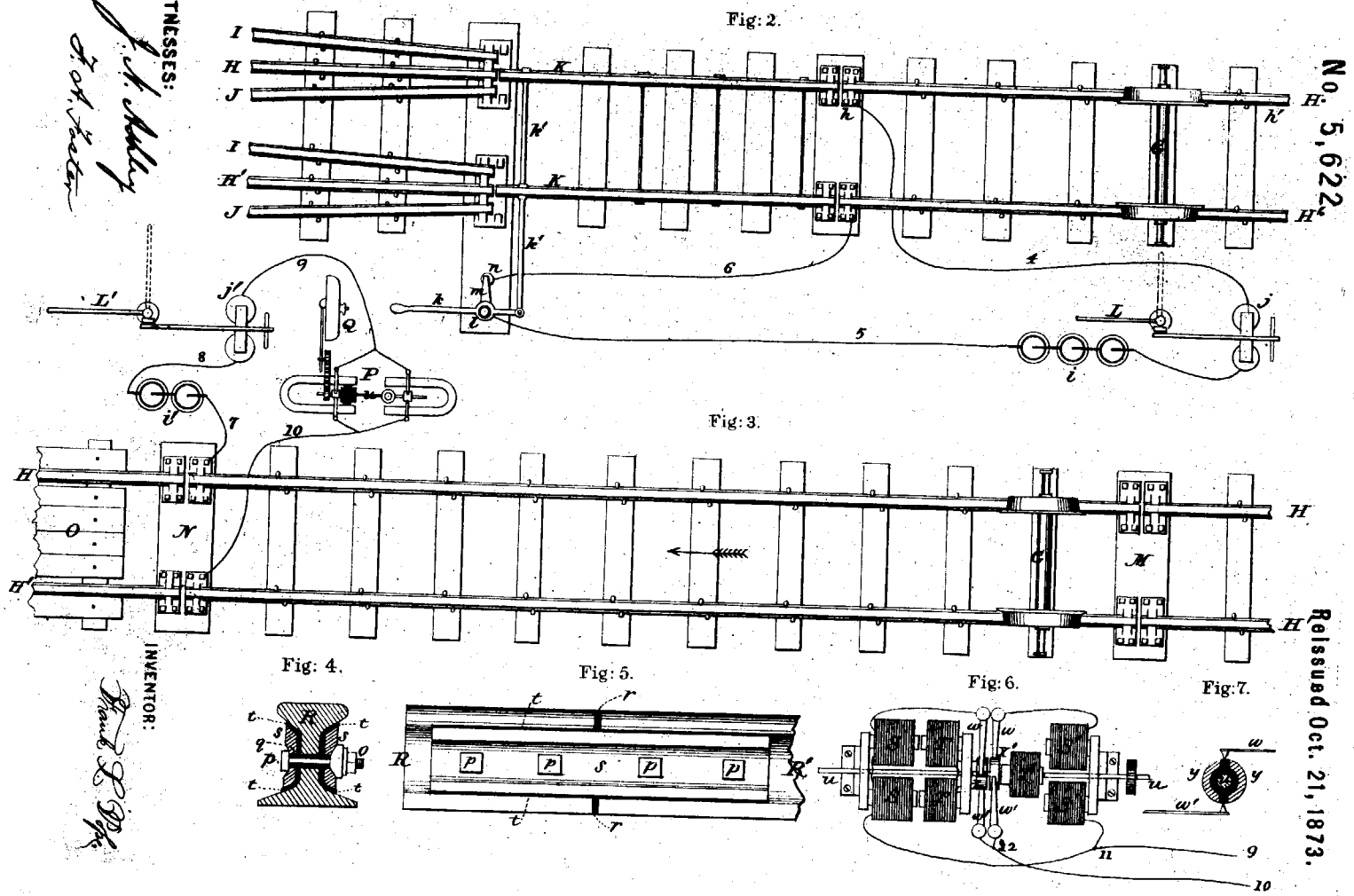
WITNESSES:
J. N. Ashley
F. A. Foster
INVENTOR:
Frank L. Pope

UNITED STATES PATENT OFFICE.

FRANK L. POPE, OF ELIZABETH, NEW JERSEY, ASSIGNOR TO HIMSELF, STEPHEN C. HENDRICKSON, OF BROOKLYN, NEW YORK, AND JAMES N. ASHLEY AND JAMES D. LINCOLN, OF GREENVILLE, NEW JERSEY.

IMPROVEMENT IN ELECTRIC SIGNALING APPARATUS FOR RAILROADS.

Specification forming part of Letters Patent No. 129,425, dated July 16, 1872; reissue No. 5,622, dated October 21, 1873; application filed May 28, 1873.

*To all whom it may concern:*

Be it known that I, FRANK L. POPE, of Elizabeth, in the county of Union and State of New Jersey, have invented certain new and useful Improvements in Electric Signaling Apparatus for Railroads; and I do hereby declare that the following is a full, clear, and exact description of the same, reference being had to the accompanying drawings, which form part of this specification.

My invention consists, first, in a method of limiting the extent of an electrical circuit, wherein the rails of a railroad-track and the axles and wheels of a passing locomotive or train form a portion of the said circuit, by arranging the ends of the abutting rails in or upon separate chairs or supporting-plates, either with or without an insulating substance interposed between said ends. Secondly, in the combination of an audible or alarm signal when stationary as to location, an electro-magnet (one or more) for operating such alarm or causing it to be operated, a battery, and one or more rails of an insulated section of railroad-track, forming a portion of an electrical circuit, the whole being so arranged that, when a metallic connection is formed between the said rails—as by the axle and wheels of a locomotive or car—the mechanism which actuates the alarm will be caused to operate, and thereby give notice to an approaching train as to whether or not any given portion of the track ahead is occupied or obstructed by a preceding train. Thirdly, in the combination of a visual or semaphoric signal of any suitable construction, an electro-magnet (one or more) for controlling the movements of said signal, a battery, and one or more rails of an insulated section of railroad-track, forming a portion of an electrical circuit, the whole being so arranged that when a metallic connection is formed between the said rails—as by the axle and wheel of a locomotive or car—the said signal will be moved so as to indicate whether or not any given section of track is occupied or obstructed. Fourthly, in the combination of a visual or semaphoric signal, an audible or sounding signal—each under the control of one or more electro-magnets—and a battery with an electrical circuit composed in part of wires, and in part of one or more rails of an insulated section of railroad-track, whereby both audible and visual signals are simultaneously given. Fifthly, in the combination of a visual or semaphoric signal, moved in one direction by one or more electro-magnets, and in the other by a spring or its equivalent, and provided with suitable mechanism for multiplying the motion of the armature of the said electro-magnets, and for transmitting the same to the said signal, with an electrical circuit composed in part of one or more rails of an insulated section of railroad-track, the whole being so arranged that the passage of a locomotive or train will cause the said signal to be practically displayed, and its movements visible at a distance. Sixthly, in the combination of a circuit-closer of any suitable construction with an electrical circuit composed in part of wires, or other suitable conductors, in part of the rail or rails of a railroad-track, and in part of the wheels and axles of a locomotive or car, whereby the position of the rails at any given point in advance—as, for instance, at a switch or draw-bridge—will be correctly indicated to the engineer of an approaching train. Seventhly, in an improved method of practically insulating from each other adjacent or abutting ends of the rails of a railroad-track when the same are connected together by the well-known fish-joint. Eighthly, in the combination, with an electrical circuit composed in part of wires, in part of the ordinary rails of a railroad-track, and in part of the wheels and axles of a locomotive or car, of an electro-motor, arranged to operate an audible signal or alarm. Ninthly, in a new and improved electro-motor for actuating signals.

In the accompanying drawings, Figure 1 represents my improved method of operating signals, as applied to a double-track railroad, and designed to form what is technically known as a "block-signal." Fig. 2 represents the same applied to a railroad-switch. Fig. 3 represents the same applied to a railroad-crossing, in connection with an alarm and signal. Fig. 4 is a detached enlarged view, showing a cross-section of an insulated rail-joint, and Fig.

5 is a side elevation of the same. Fig. 6 represents the electro-motor for operating the alarm, and Fig. 7 is a detached view of the commutator forming a part of said electro-motor.

A and A′ (refer to Fig. 1) represent the two tracks of a double-track railroad. On the track A the trains run from right to left, and on the track A′ from left to right, as indicated by the arrows. The rails of the track A are divided at the joint, B, B′, C, and C′, and the ends are secured to metallic chairs, as at *b b′ c c′*, resting upon wooden ties or sleepers D D, whereby any desired length of track is insulated from the remainder, so as to produce an insulated section of track. Thus, it will be understood that the rails of the track form a metallic electrical conductor from B to C, and also from B′ to C′, but that the metallic continuity does not extend beyond B B′ and C C′ in either direction. Each line of rail is also insulated sufficiently from the other by means of the non-conducting wooden-ties D D, upon which they rest. The section of track embraced between B B′ and C C′ may be of any required length, according to circumstances, or, if desirable, the whole length of the railroad may be divided into similar sections of convenient extent, adjacent to each other. At the end of the section which is first reached by a train moving in the proper direction is placed a signal, E, operated by an electro-magnet, *e*. In view of the fact that the distance through which an electro-magnet is capable of attracting its armature is always very small, and that, owing to the unavoidably imperfect insulation of the track, only a battery of a small number of elements can be used in a circuit of which the said track forms a portion, I find it necessary to interpose between the armature-lever of the magnet *e* and the signal E suitable mechanism, by means of which the movement of the armature will be sufficient to move the signal far enough from its normal position to practically display it to the engineer of an approaching train while yet at a safe distance, and thereby remove the liability of mistaking the true position of such signal. It is very desirable that the fan or disk E of the signal should be constructed of light material, and it is also advisable that it should be properly balanced, so as to move with as little resistance as possible. The fan or disk thus constructed may be attached by its edge to an upright or vertical shaft in such a manner that, by causing the shaft to revolve or turn through the distance of one-fourth of a complete revolution, the concealed face of the signal may be exposed, or vice versa, accordingly as it may be arranged.

In Fig. 1 is shown a plan or top view of the signal and signal mechanism. The fan or disk E is attached by one of its edges to a vertical shaft, which is provided with a screw-thread or spiral rib formed upon it. The armature-lever of the electro-magnet *e* carries upon its extreme end a small roller, which is arranged to travel upon the said spiral rib as upon a track. By this means the pressure of the armature-lever and its roller upon the spiral rib will cause the upright shaft to turn and the fan or disk to be moved. By this device a very small movement of the armature of the magnet *e* will move the fan or disk E through the distance of one-fourth of a revolution. When the attraction of the magnet ceases the fan or disk returns to its normal position by the action of a spring or weight.

I make no claim to the above-described device for communicating motion from the armature of a magnet to a disk or fan, considered by itself, as it is clearly shown and described in the United States Letters Patent of Hendrickson and Pope, No. 129,408, of July 16, 1872, the application for which was filed September 8, 1871, and shown in Fig. 3 of the drawings accompanying said patent.

Another method of accomplishing the same result is shown and described in Hendrickson's United States Letters Patent, No. 115,610, dated June 6, 1871.

I do not, therefore, claim by themselves the parts employed for communicating motion from the armature of the magnet *e* to the fan or disk E.

A conducting-wire, 1, which may be protected by a suitable insulating coating, is attached to the chair *c″*, or in any other manner, so as to be in metallic connection with the rail B′ C′, and its other extremity is connected with one pole of a galvanic battery, F. From the other pole of said battery F a wire, 2, leads to the electro-magnet *e*, from which a wire, 3, is conducted to the chair *c*, so as to be in metallic connection with the other rail of the track B C.

It will be understood that when the circuit is completed by the metallic axle and wheel G of a locomotive or car, the electro-magnet *e* will be charged and the signal E exhibited at right angles to the track, as shown at Fig. 1, and that the said signal will remain displayed during the time that the axle and wheels G (representing a train) are passing from C C′ to B B′, but after passing beyond B B′ the circuit will be broken and the signal E will cease to be displayed, and will assume the position shown by the dotted lines. When the train enters upon the section commencing at B B′, the signal E′ will be displayed in the same manner. Therefore, the engineer of a train on arriving at the point C C′, and finding the signal E displayed, will be made aware that a preceding train is occupying the section of track in advance of him, but will be notified by the withdrawal of the signal so soon as the preceding train has passed beyond the limits of the said section in advance, in which case he can proceed with safety. The sections of the return track A′ are arranged in precisely the same manner as is shown in the drawing, and therefore no further explanation is required.

Fig. 2 shows the application of my improved method of operating signals in connection with a switch. H H′ represent the rails of the main track of a railroad. I I and J J are the rails of two branch tracks or sidings. K K are the movable rails of a switch, and are capable of being adjusted in line with the main or with either of the branch tracks by means of a lever, *k*, which is pivoted at *l* and connected with the movable rails K K by connecting-rods *k′ k′*. A section of the main track *h h′*, which may be at any distance from the switch and of any suitable length, is insulated from the adjacent portions of the track in the manner previously described, and provided with a signal, L, operated with an electro-magnet, *j*, in any suitable manner. A circuit-closing arm, *m*, projects from the lever *k* of the switch, and is so arranged in reference to the metallic stud *n* as to be in contact therewith when the movable rails K K are adjusted in line with the rails of the main track H H′; but if moved into line with either the rails I I or J J of the sidings the arm *m* will be moved out of contact with the stud *n*. An insulated wire, 5, extends along the line of the railroad-track, one end of which connects with the arm *m*, and the other end proceeds to the battery *i*, and thence to the electro-magnet *j*, from which a wire, 4, proceeds to one rail of the insulated section of track at *h*. A wire, 6, connects the other rail of the insulated section of track with the stud *n*. If the switch is adjusted in its normal position in line with the main track, as shown in Fig. 2, the circuit between *m* and *n* will be uninterrupted, and the closing of the circuit between H and H′ by the advancing train G will cause the signal L to assume the position shown in the drawing, indicating "safety;" but at all times when no train is passing over the insulated section of the track the circuit will remain broken and the signal L will continue in the position shown by dotted lines, indicating "danger." But if the switch be adjusted in line with one of the branch tracks I I or J J the circuit at *m n* will be interrupted, and the closing of the circuit between H H′, by an advancing train, will have no effect upon the signal L, which will continue to indicate "danger" until the circuit is closed at *m n*, when it will again resume the position shown in the drawing indicating "safety."

Fig. 3 shows the application of my improved system of signaling to a road-crossing. H H′ are the rails of the track, the section between M and N, representing a distance of half a mile, more or less, being insulated from the remaining portions of the track, as hereinbefore described. O is the road-crossing adjacent to the end of the insulated section of the track at N. L′ is a suitable signal, which is displayed by the action of an electro-magnet, *j′*. P is an electro-motor, the construction of which will hereinafter be particularly described. Q is an alarm-bell or gong, designed to be sounded by the action of the electro-motor P when the latter is in motion. Such audible or alarm signal may be located at any appropriate place; but it is intended and designed to be stationary as to location. The electrical circuit, in this instance, may be traced as follows: From the rail H of the track, by the wire 7, through battery *i′*, wire 8, electro-magnet *j′*, wire 9, electro-motor P, and wire 10, to the opposite rail of the track H′. When the train G, moving in the direction indicated by the arrow, reaches the point M, the electrical circuit between H and H′ will be completed, and the signal L′ displayed at the crossing O by the action of the electro-magnet *j′*. At the same time the electro-motor P, included in the same circuit, will be set in motion, and will cause the bell Q to be rung continuously until the train reaches the point N, when the circuit will be interrupted, causing the signal L′ to assume the position shown by the dotted lines, and the electro-motor P to cease its action upon the bell Q.

The arrangement for insulating a rail of the track from the adjacent rail, as shown at *b b′* in Fig. 1, and elsewhere, is designed more especially for use on railroads which employ the mode of securing the ends of the rails by what is technically termed a "chair;" and in this case, if necessary, a thin plate of wood, vulcanite, or other suitable insulating material may be placed between the ends of the adjacent rails to prevent them from coming in contact with each other.

For railroads where the so-called "fish-joint" is employed, I have devised the mode of insulation shown in Figs. 4 and 5. R and R′, Fig. 5, are the ends of two adjacent rails, which are to be electrically insulated from each other. A plate of vulcanite or other suitable insulating material, *r*, is interposed between the ends of the rails R and R′. The plates or bars *s s*, Figs. 4 and 5, which are of a well-known construction, are secured to each other and to the rails by bolts *p* and nuts, as shown at *o*, Fig. 4. The plates or bars *s s*, Figs. 4 and 5, are kept from metallic contact with the rails by insulating-plates *t t*, and the bolts *p p*, passing through slotted holes in the rail, are insulated by the sheathing of suitable insulating material *q*, Fig. 4.

Fig. 6 shows the details of the construction of the electro-motor P, hereinbefore referred to. S and S′ are two fixed electro-magnets of the usual construction. T and T′ are two other electro-magnets, of similar construction, fixed at right angles to each other upon a shaft, *u u*, which is capable of revolution upon its axis, passing freely through the yokes of the magnets S and S′. The magnets T and T′ are so arranged that their poles revolve in close proximity to those of the magnets S and S′, respectively, as clearly shown in the drawing. Two commutators, X X′, are fixed upon the shaft *u u*, the construction of which is shown in detail in the enlarged cross-section, Fig. 7. Each commutator consists of two semicircular pieces of metal, *y y*, fixed upon opposite sides of the axis *u*, but insulated from that and from each other. To each of these segments is soldered one end of the wire of the helices of the adjacent magnet T or T′. The battery-current is conveyed to the electro-magnet by two springs, *w w′*, pressing upon opposite sides of the commutator, which are so arranged that the current through the magnet T or T′ is reversed at the instant its poles are opposite those of the stationary magnet S or S′. The electric current enters by the wire 9 and proceeds to the point 11, from which two branch circuits lead, respectively, through the stationary electro-magnets S S and S′ S′, and thence to the commutators X X′ by the springs *w w*. From the opposite springs *w′ w′* the branch circuits again unite at the point 12, and from thence by the wire 10, as hereinbefore explained.

The breaks in the respective commutators being arranged at right angles to each other, it will be understood that the circuit from 9 to 10 will at all times be complete through one of the two branch circuits, and that a signal may be operated in the same circuit without interference or interruption arising from the action of the electro-motor.

The manner in which a rotatory motion may be produced by the alternate attraction and repulsion between the poles of a revolving electro-magnet and a stationary magnet, which may be either an electro-magnet or a permanent magnet, is well known, and requires no further explanation. Any suitable mechanism may be employed in connection with the motor P in order to sound the bell Q.

Where it is necessary to operate a switch or any additional signal, in addition to the "block-signal" system, shown in Fig. 1, it may be accomplished by the use of an additional rail, parallel with the usual rail of the track and insulated therefrom, resting upon springs or otherwise, so that the wheels of the train may be brought in contact with both rails simultaneously, thus closing an additional circuit without interfering with the primary circuit passing through the ordinary rail. If necessary the primary circuit, which includes the rail or rails, may be caused to actuate a relay of the usual construction, which may in turn actuate the signal by means of a secondary or local circuit, the same or an additional battery, in a manner well understood among those skilled in the art of telegraphy.

It will be observed that I do not make use of the earth as a part of the circuit in any of the hereinabove-described arrangement of conductors, but that the circuit exterior to the battery when completed, consists entirely and exclusively of a series of metallic conductors in every instance. I prefer this arrangement on account of the difficulty of securing an adequate insulation between the rails and the earth, when both rails and earth are included in and form part of the circuit.

In some cases it is not necessary to insulate for the desired distance more than one line of the rails of a railroad-track in order to cause a signal to be operated by the passage of a locomotive or car, and when a suitable distance or section of one line of rails only is insulated, one of the electrical wires or conductors is to be attached to the said insulated line of rails, and the other to the opposite or uninsulated line of rails.

I do not confine myself to the particular mode of constructing a signal, or to the particular mechanism for multiplying the distance moved by the armature of an electro-magnet, and for communicating said movement to the signal which has been hereinbefore described. Nor do I limit myself in the combination I have shown to the particular device M N, shown in Fig. 2, for closing the circuit at the switch, as there are many devices which may be made use of to accomplish this result. Neither do I claim, broadly, the method of producing rotatory motion by means of the attraction and repulsion between rotating and fixed magnets.

I am aware that it is not new to interpose a device for multiplying motion between the armature-lever of an electro-magnet and a semaphoric or visual signal, and therefore do not claim by itself any specific machinery for accomplishing this result, but will remark that the combination of such machinery with a circuit of which the rails of a railroad-track form a part I believe to be new and important.

What I claim as my invention, and desire to secure by Letters Patent, is—

1. The arrangement of the ends of two abutting rails of a railroad-track on separate chairs or supports upon a sleeper, whereby metallic contact between the said rails is prevented and the extent of an electrical circuit limited, substantially as and for the purpose herein specified.

2. The combination of a stationary alarm or audible signal, an electro magnet or magnets, a battery, and one or more rails of an insulated section of railroad-track, so arranged relatively to each other that, so soon as a metallic connection is formed between the said rails, as by the axle and wheels of a locomotive or car, the mechanism which actuates the alarm will be caused to operate, substantially as described.

3. The combination of a visual or semaphoric signal, an electro magnet or magnets, a battery, and one or more rails of an insulated section of railroad-track, so arranged relatively to each other that so soon as a metallic connection is formed between the said rails, as by the wheels of a locomotive or car, the said signal will be moved, substantially as specified.

4. The combination of the following elements: A visual or semaphoric signal, L′, an audible or sounding signal, Q, both under the control of one or more electro-magnets, a battery, and an electrical circuit composed in part of wire and in part of one or more rails of an insulated section of railroad-track, substantially as specified.

5. The combination of the following elements: A visual or semaphoric signal, moved in one direction by one or more electro-magnets and in the other direction by a spring or its equivalent, a suitable mechanism for multiplying the motion derived from the armature of the said electro magnet or magnets interposed between said armature or armatures and the signal, and an electrical circuit composed in part of one or more rails of an insulated section of a railroad-track, substantially in the manner and for the purpose herein specified.

6. The combination of the circuit-closer *m n* with the electrical circuit 4 5 6 H H′ G, substantially as and for the purpose herein specified.

7. The combination, with an insulated rail, which, in conjunction with wires or conductors connected thereto, forms part of an electric circuit, and an adjacent insulated or uninsulated rail of a railroad-track, and a parallel fish bar or bars provided with bolts passing through such bars and rails, of a suitable intervening or interposed non-conducting material, whereby the insulation between said adjacent rails is maintained, and the extent of an electrical circuit, formed in part of one or more rails of a railroad-track, thereby limited, substantially as set forth.

8. The combination of a suitable insulating material, *q*, with the bolts *p p*, whereby the said bolts are insulated from the rails R R′ or from the insulated fish-plates *s s*, substantially as and for the purpose herein specified.

9. The combination with the electrical circuit, composed of wires and the ordinary rails of a railroad-track, and the axles and wheels of a railroad-train, of an electro-motor for operating a signal or alarm, substantially as and for the purpose herein specified.

10. An electro-motor composed of the stationary magnets S S and S′ S′, the revolving magnets T T and T′ T′, and the commutators X and X′, when said two revolving magnets, and also the two commutators, are arranged at right angles to each other, whereby an audible alarm may be operated without interfering with the action of a magnet, which serves to actuate a semaphoric or visual signal included in the same circuit.

FRANK L. POPE.

Witnesses:
M. M. LIVINGSTON,
A. J. DE LACY.